(12) United States Patent
Sohmer

(10) Patent No.: US 6,861,166 B2
(45) Date of Patent: Mar. 1, 2005

(54) FUEL CELL SYSTEM

(75) Inventor: Peter Sohmer, Kirchheim/Teck (DE)

(73) Assignee: Ballard Power Systems AG, Kirchheim-Nabern (DE)

( * ) Notice: Subject to any disclaimer, the term of this patent is extended or adjusted under 35 U.S.C. 154(b) by 239 days.

(21) Appl. No.: 09/860,510

(22) Filed: May 21, 2001

(65) Prior Publication Data

US 2002/0012826 A1 Jan. 31, 2002

(30) Foreign Application Priority Data

May 20, 2000 (DE) .......................................... 100 25 035

(51) Int. Cl.[7] .............................. H01M 8/00; H01M 2/14
(52) U.S. Cl. ............................. 429/12; 429/38; 429/39
(58) Field of Search ............................. 429/12, 34, 38, 429/39; 96/380, 381, 384, 385; 181/284

(56) References Cited

U.S. PATENT DOCUMENTS

| 4,492,533 | A | | 1/1985 | Tsuge ............................ 417/372 |
|---|---|---|---|---|
| 4,828,932 | A | * | 5/1989 | Morimoto et al. ............ 428/608 |
| 5,248,566 | A | * | 9/1993 | Kumar et al. ................... 429/19 |
| 5,783,780 | A | * | 7/1998 | Watanabe et al. ............ 181/229 |
| 6,331,103 | B1 | * | 12/2001 | Teraoka ........................ 418/181 |

FOREIGN PATENT DOCUMENTS

| DE | 38 31 703 C1 | | 3/1990 | |
|---|---|---|---|---|
| DE | 196 15 017 A1 | | 10/1997 | |
| DE | 198 04 567 A1 | | 8/1999 | |
| DE | 199 48 146 A1 | | 3/2001 | |
| JP | 54-15510 | | 2/1979 | |
| JP | 56-104179 | | 8/1981 | |
| JP | 58-156136 | | 9/1983 | |
| JP | 6-124719 | | 5/1994 | |
| JP | 10-289725 | * | 10/1998 | ............ H01M/8/04 |
| WO | WO 97/40271 | | 10/1997 | |
| WO | WO 99/40567 | | 8/1999 | |

* cited by examiner

Primary Examiner—Patrick Ryan
Assistant Examiner—Julian Mercado
(74) Attorney, Agent, or Firm—Seed IP Law Group PLLC

(57) ABSTRACT

A fuel cell system has at least one fuel cell and a fan for supplying air to the at least one fuel cell. Sound-absorbing means for absorbing sound in the air section of the fuel cell system are designed as broadband silencers.

11 Claims, 1 Drawing Sheet

FUEL CELL SYSTEM

BACKGROUND AND SUMMARY OF THE INVENTION

This application claims the priority of German patent document 100 25 035.1, filed 20 May 2000, the disclosure of which is expressly incorporated by reference herein.

The invention relates to a sound absorbing arrangement in a fuel cell system.

Noise emission occurs in various regions of fuel cell systems, particularly in pipelines of fuel cell systems which operate with air-fans, such as Roots blowers or Wankel compressors. Noise emissions of this nature are undesirable, particularly when the fuel cell system is used in a vehicle or in an installation in which noise emissions are disruptive.

It is known to reduce noise emissions in vehicles using silencers, such as suction silencers or final silencers.

One object of the invention is to provide a fuel cell system with reduced noise emissions.

This and other objects and advantages are achieved by the fuel cell system according to the invention having at least one fuel cell, and sound-absorbing means arranged substantially at regions of the air section at or in which a noise emission is generated. It is expedient to provide sound-absorbing means at the inlets and outlets of the sound source. The sound-absorbing means are particularly preferably designed as broadband silencers.

The particular advantage of the sound absorbent arrangement according to the invention is that the sound is deadened at the locations at which it is produced. As a result, smaller components can be used for sound absorbing, and bulky final silencers can be eliminated. This is particularly beneficial when the fuel cell system according to the invention is used in a vehicle, in which there are considerable restrictions in terms of the space available. Furthermore, the acoustic impression provided by a fuel cell system or vehicle of this type is significantly improved. The use of broadband silencers makes it possible to expediently deaden units with wide frequency spectra of noise emission.

Other objects, advantages and novel features of the present invention will become apparent from the following detailed description of the invention when considered in conjunction with the accompanying drawings.

DETAILED DESCRIPTION OF THE DRAWINGS

The invention is particularly suitable for the use in fuel cell systems in mobile installations, such as for example fuel cell vehicles, although it is not restricted to such use.

Figure 1:
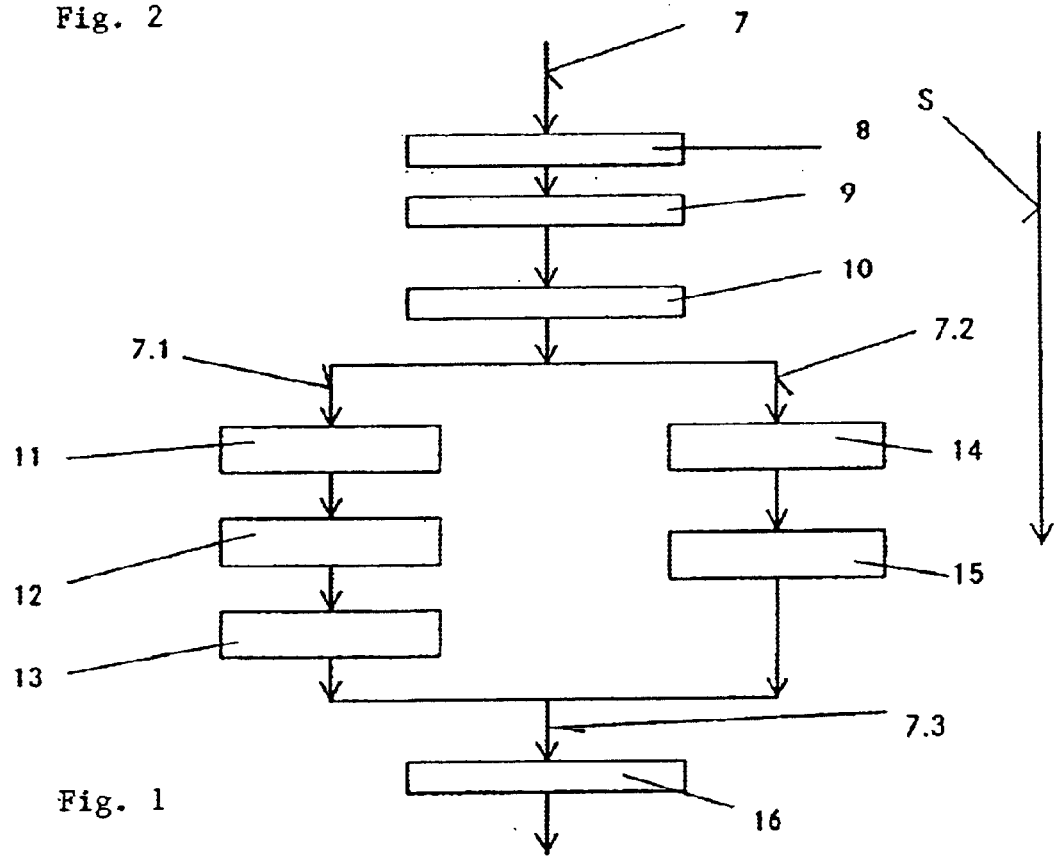
FIG. 1 shows a portion of a fuel cell system according to the invention, with a first advantageous arrangement of silencers.

FIG. 1 depicts diagrammatically an advantageous configuration of the fuel cell system according to the invention, showing one air section of the system. A suction device 8 for sucking in air, an air filter 9 and a first silencer 10 are arranged in the direction of flow S along an air section 7, which branches into a first partial section 7.1 and a second partial section 7.2. A second silencer 11, a fuel cell unit 12 and a third silencer 13 are arranged in the direction of flow S in the first partial section 7.1, while a fourth silencer 14 and a catalytic burner 15 are arranged in the direction of flow S in the second partial section 7.2.

Downstream of the catalytic burner 15 and the third silencer 13, the two partial sections 7.1, 7.2 are combined again to form a common air section 7.3, in which a fifth silencer 16 is arranged in the direction of flow S.

The silencers 10, 11, 13, 14, 16 are advantageously arranged at those locations of the system at which disruptive noises are generated, for example by pulses of a fluid in fluid-carrying lines. As a result, noise emission is reduced precisely at the locations at which noises are produced. Consequently, the transmission of noise along the lines (in this case the air section 7, 7.1, 7.2, 7.3) is significantly reduced. As a result, it is possible, for example, to reduce the size of, or even disperse with, a final silencer at the end of the air section 7, 7.1, 7.2, 7.3 and/or a suction silencer at the start of this section.

Particularly when used in a fuel cell vehicle, it is advantageous if it is possible to dispense with bulky components.

The silencers 10, 11, 13, 14, 16 may be designed such that they are suitable for absorbing a frequency range for sound-deadening at least from 400 Hz to 4000 Hz, corresponding to the frequency ranges in which the compressor/expander unit and the blower of the catalytic burner 15 emit undesirably loud noises. A preferred type of silencer is a so-called Helmholtz silencer. This silencer comprises, for example, two concentric cylinders, rows of holes being arranged substantially equidistantly, in the radial direction, on the inner cylinder and a plurality of such rows of holes following one another in the axial direction. The axial distances between the rows of holes may vary. For example, there may be a high density of rows of holes at one end of the cylinder while the density may decrease towards the other end of the cylinder. If the density is high, high frequencies are preferentially deadened, while if the density is low, low frequencies are preferentially deadened. The volume between the cylinders may be divided into chambers, in order to improve the deadening.

It is particularly expedient for the silencers 10, 11, 13, 14, 16 to be arranged at least adjacent to regions of the media-carrying lines at which pulses occur in the air. The first silencer 10 is arranged at the inlet to the compressor and to the blower of the catalytic burner. The second silencer 11 is arranged at the outlet of the compressor and at the inlet to the fuel cell unit 12. The third silencer 13 is arranged at the inlet to the expander of the compressor/expander unit. The fourth silencer 14 is provided at the inlet to the catalytic burner. The fifth silencer 16 is arranged at the outlet of the expander and at the outlet of the blower of the catalytic burner 15.

It is favourable for the sound-absorbing means 10, 11, 13, 14, 16 to be arranged substantially rotationally symmetrically around the lines 7, 7.1, 7.2, 7.3 or around the inlets of compressor and blower or the outputs of the compressor and blower. The sound-absorbing means are preferably manufactured from metal or plastic, particularly preferably from aluminium or an aluminium alloy. This alloys very good sound deadening without increasing the weight of the system excessively. It is particularly favourable to use silencers made from polyamide or stainless steel upstream of fuel cells, in order to prevent the fuel cells from becoming contaminated with aluminium.

Figure 2:
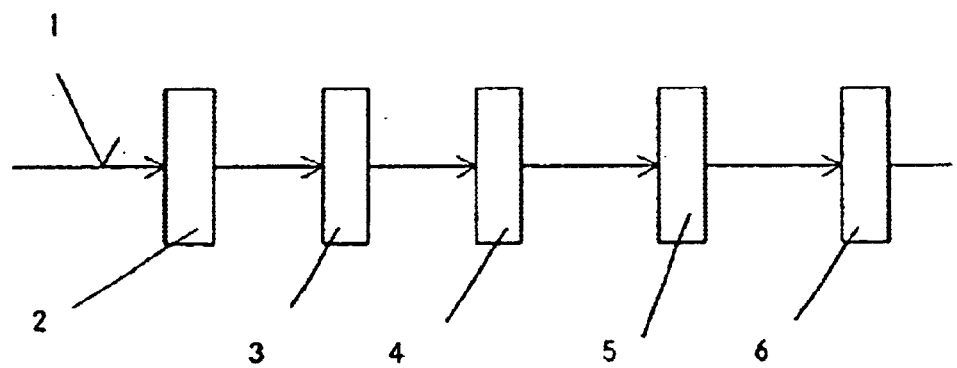
FIG. 2 shows a portion of a fuel cell system according to the invention having a second advantageous arrangement of silencers.

FIG. 2 depicts diagrammatically a further embodiment of a fuel cell system with preferred broadband silencers. A suction device 2 for sucking in air, an air filter 3, a first silencer 4, a compressor/fan unit 5 for supplying cathode air to a fuel cell unit (not shown) of the fuel cell system and a second silencer 6 are arranged in the direction of flow along an air section 1. The fuel cell unit has at least one fuel cell with anode space and cathode space which are separated by an ion-conducting membrane. Air is sucked in by the suction device 2 and is passed through the air filter 3 into the compressor of the compressor/fan unit 5, where it is compressed and fed to the cathode of the fuel cell unit.

As a result of the compression of the air in the air section 1, under customary flow conditions pulses are formed in the air, entailing considerable noise emissions. The first silencer 4 is arranged upstream of the compressor, on its inlet side, and the second silencer 6 is arranged downstream of the compressor of the compressor/fan unit 5, at the outlet of the compressor.

According to the invention, the first and second silencers 4, 6 are designed as broadband silencers. Conventional silencers, such as commercially available final silencers or suction silencers, which are designed as absorption/reflection silencers, are only able to deaden a small part of the noise spectrum produced. By contrast, the broadband silencers are designed in such a way that they are able to substantially deaden frequencies of the noise spectrum. Preferably the sound-absorbing means are designed in such a way that they have a frequency range for sound deadening which substantially corresponds to the frequency range of the noise emissions of the body whose sound is to be absorbed.

Figure 3:
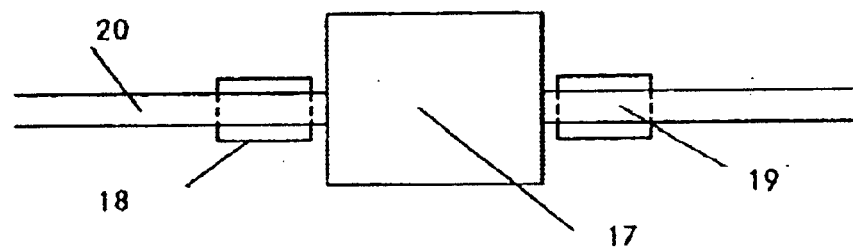
FIG. 3 shows an advantageous arrangement of sound-absorbing components.

FIG. 3 illustrates an advantageous arrangement of sound-absorbing components in a fuel cell system. A sound source 17 is arranged in a media-carrying line 20. Silencers 18, 19 are arranged at both the inlet and the outlet of the sound source 17. It is particularly expedient if the silencers 18, 19 are integrated in the line 20 in such a way that the medium can flow through them directly. The silencers 18, 19 surround the line or the flow path 20 in a manner similar to a sleeve, and are expediently arranged as close as possible to the inlet and/or outlet of the sound source 17.

When using sound-absorbing components such as for example a Helmholtz silencer, whose deadening capacity along its axis through which medium can flow is frequency-dependent, the fitting direction is particularly preferably selected in such a way that the particular region of the silencer 18, 19 which deadens high frequencies better than low frequencies faces the sound source 17.

The fuel cell system according to the invention is preferably used in a fuel cell vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system, comprising:
   at least one fuel cell;
   starting from the air feed in an air section with a direction of flow, a first broadband silencer is arranged downstream;
   the air section downstream of the first broadband silencer is divided into a first partial section and a second partial section;
   a compressor is arranged downstream in the first partial section;
   a second broadband silencer is arranged downstream of the compressor and upstream of a cathode air supply of the at least one fuel cell;
   a third broadband silencer is arranged downstream of the at least one fuel cell and upstream of an expander;
   in the second partial section, downstream, a fourth broadband silencer is arrange upstream of a blower for supplying air to a catalytic burner;
   the catalytic burner is arranged downstream of the blower;
   the first and second partial sections are brought together again in a common air section downstream of the catalytic burner and downstream of the expander; and
   a fifth broadband silencer for insulating an outlet side of expander and blower is arranged in the common air section.

2. The fuel cell system of claim 1 wherein at least one of the first, second, third, fourth or fifth broadband silencer absorbs a frequency range for sound-deadening from 400 Hz to 4,000 Hz.

3. The fuel cell system of claim 1 wherein each of the first, second, third, fourth and fifth broadband silencers absorb a frequency range for sound-deadening from 400 Hz to 4,000 Hz.

4. The fuel cell system of claim 1 wherein at least one of the first, second, third, fourth or fifth broadband silencer is a Helmholtz silencer.

5. The fuel cell system of claim 1 wherein each of the first, second, third, fourth and fifth broadband silencers is a Helmholtz silencer.

6. The fuel cell system of claim 1 wherein at least one of the first, second, third, fourth or fifth broadband silencer is formed from a material selected from the group consisting of aluminum, an aluminum alloy, a stainless steel and a plastic.

7. The fuel cell system of claim 1 wherein each of the first, second, third, fourth and fifth broadband silencers is formed from a material selected from the group consisting of aluminum, an aluminum alloy, a stainless steel and a plastic.

8. A fuel cell vehicle comprising the fuel cell system of claim 1.

9. A fuel cell system, comprising:
   at least one fuel cell;
   a means for supplying cathode air to the at least one fuel cell;
   a suction device for supplying ambient air to the means for supplying cathode air;
   a first Helmholtz silencer located between the suction device and the means for supplying cathode air; and
   a second Helmholtz silencer located between the at least one fuel cell and the means for supplying cathode air,
   wherein the ambient air flows from the suction device, through the first Helmholtz silencer, and to the means for supplying cathode air, and wherein the cathode air flows from the means for supplying cathode air, through the second Helmholtz silencer, and to the at least one fuel cell.

10. The fuel cell system of claim 9, wherein the means for supplying cathode air is selected from the group consisting of a compressor, a fan and a blower.

11. A fuel cell vehicle comprising the fuel cell system of claim 9.

* * * * *